United States Patent [19]

Reeves et al.

[11] Patent Number: 4,782,662
[45] Date of Patent: Nov. 8, 1988

[54] BOOM CRANE CENTERING

[75] Inventors: William E. Reeves; Jasper E. Cobb, III, both of Gainesville, Tex.

[73] Assignee: National-Oilwell, Houston, Tex.

[21] Appl. No.: 32,180

[22] Filed: Mar. 30, 1987

Related U.S. Application Data

[63] Continuation of Ser. No. 655,215, Sep. 27, 1984, Pat. No. 4,653,271.

[51] Int. Cl.⁴ ............... F16D 31/00; F16D 31/02
[52] U.S. Cl. ........................... 60/327; 60/494; 91/437; 91/461
[58] Field of Search .................. 60/468, 494, 327; 91/437, 440, 461, 459

[56] References Cited

U.S. PATENT DOCUMENTS

| | | | |
|---|---|---|---|
| 3,303,647 | 2/1967 | Futamata | 60/494 X |
| 3,473,442 | 10/1969 | Farmer et al. | 60/494 X |
| 3,994,133 | 11/1976 | Pfeil et al. | 60/468 X |
| 3,999,386 | 12/1976 | Crull et al. | 60/468 X |
| 4,194,365 | 3/1980 | Stoufflet et al. | 60/494 |
| 4,293,229 | 10/1981 | Heyl | 60/445 X |
| 4,475,442 | 10/1984 | Breeden | 91/461 |
| 4,479,349 | 10/1984 | Westveer | 60/445 X |
| 4,653,271 | 3/1987 | Reeves et al. | 60/494 |

FOREIGN PATENT DOCUMENTS 2154593  5/1973  Fed. Rep. of Germany ........ 91/437

Primary Examiner—Edward K. Look
Attorney, Agent, or Firm—Frost & Jacobs

[57] ABSTRACT

The present invention incorporates a free swing system into the hydraulic flow system of a boom crane in order to permit an operator to control the boom crane during the centering operation, which occurs immediately before and during the hoisting of a load. The free-swing system is incorporated into the hydraulic flow system between the swing control valve and the hydraulic swing motor and operates by "bleeding-off" a portion of the hydraulic fluid being pumped to or by the hydraulic swing motor so as to greatly reduce or control the rotational speed of the hydraulic swing motor.

5 Claims, 2 Drawing Sheets

BOOM CRANE CENTERING

This is a continuation of application Ser. No. 655,215, filed Sept. 27, 1984, now U.S. Pat. No. 4,653,271.

BACKGROUND OF THE INVENTION

1. Field of the Invention

The present invention relates to centering a boom crane on a pedestal and more particularly to a hydraulic control circuit which permits the boom crane to universally rotate in a controlled manner on the pedestal so that it may be centered over the load to be lifted.

2. Description of the Prior Art

In a typical environment for a boom crane operation, the load to be lifted is perhaps 150 to 200 feet from the boom crane operator. Consequently, it is difficult for the boom crane operator to accurately position the boom of the crane directly over the center of the load to be hoisted. If the boom is not centered over the load to be hoisted, the load may swing violently out of control during the initial stages of hoisting, particularly when the crane is mounted on a floating drilling platform where cargo is being hoisted from an adjacent ship. This situation can create an unsafe working environment, particularly when workmen are laboring in close proximity to the load to be lifted.

In recent times crane manufacturers have employed a three-position swing control valve in which the intermediate position of the control valve is a neutral position which fluidly connects the high pressure side of the hydraulic motor to the low pressure side to permit the boom to freely rotate. However, the neutral position of the control valve does not permit the crane operator to control the boom. Consequently, the boom frequently overshoots the center position of the load, particularly when the crane is mounted in a tilted position causing the boom to swing downwardly to its lowest position. In such a circumstance, the hydraulic swing motor would, of necessity, be reemployed in an attempt to center the boom over the load to be lifted. Hence it is difficult for the operator to center the boom over the load to be lifted by engaging the neutral position of the control valve.

Accordingly, there is a need for a hydraulic control system which is capable of restricting the swing speed during the centering operation of the boom over the load to be lifted. Additionally, there is a need for allowing the crane operator to accurately control the boom during the centering operation.

SUMMARY OF THE INVENTION

In accordance with the present invention there is provided a boom crane mounted on a pedestal for hoisting loads, with one or more hoist motors to lift the load and with a swing motor to rotate the boom. The present invention can be employed on either an open loop or closed loop hydraulic system both of which are conventional in the art. An open loop system includes a hydraulic swing motor with a hydraulic pump, a hydraulic tank and a swing control valve. The closed loop system has a variable displacement pump for the hydraulic fluid, a hydraulic tank and a hydraulic swing motor. In accordance with the present invention, the swing motor in either system includes a free swing system to be engaged during the centering operation for permitting the boom crane to rotate in a clockwise or counterclockwise fashion, and yet to restrict the swing speed and permit the operator to control the centering operation.

In the broadest sense of the invention, the free swing system includes means to transfer in a controlled manner a portion of the hydraulic fluid from the high pressure line of the hydraulic swing motor to the low pressure line. For example, the free swing system may include a serially arranged flow control valve and an on/off flow blocking valve. During normal operation, the on/off flow blocking valve is in the off position, thus permitting the swing motor to rotate the boom in the conventional manner. When the free swing system is engaged, the on/off flow blocking valve is in the on position, thus permitting hydraulic fluid to flow from the high pressure line through the on/off flow blocking valve and into the flow control valve leading to the low pressure line. This flow control valve regulates the rate of hydraulic fluid transferred from the high pressure line to the low pressure line, thus controlling the speed of rotation of the hydraulic swing motor. In this manner, the speed of rotation of the boom may be controlled when the free swing system is engaged by controlling the flow of hydraulic fluid through the swing motor. Thus, the free swing system operates by "bleeding-off" a portion of the hydraulic fluid being pumped to or by the hydraulic swing motor from the high pressure line to the low pressure line.

In another modification of the free swing system, a poppet valve with an adjustable spool stop is employed as a flow control valve to control the amount of hydraulic fluid flowing from the high pressure line to the low pressure line. When the poppet valve is employed, it is necessary to use a two-way drain valve fluidly connected to the poppet valve as the on-off flow blocking valve. The drain valve permits draining of hydraulic fluid from behind the poppet, thus permitting it to open. It is also desirable to employ a pressure compensating valve downstream of the poppet valve to maintain a constant pressure drop across the poppet valve regardless of hydraulic pressure or temperature.

Further advantageous features of the invention will be apparent from the description and claims.

BRIEF DESCRIPTION OF THE DRAWINGS

The nature and characteristic features of the present invention will be more readily understood from the accompanying drawings in which.

DESCRIPTION OF THE PREFERRED EMBODIMENTS

Figure 1:
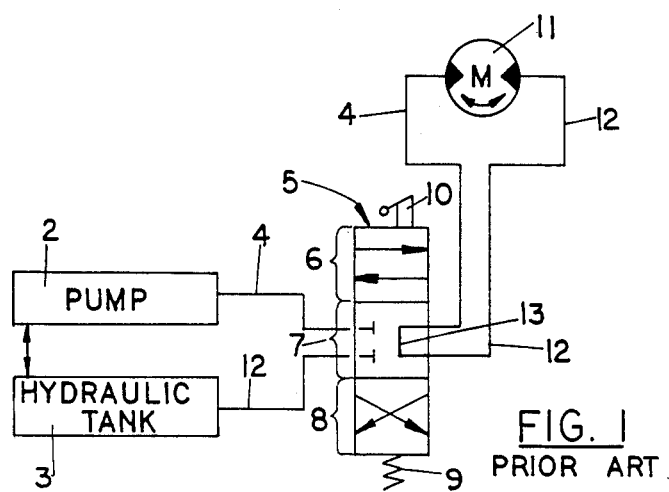
FIG. 1 is a schematic view of the free swing system of a typical prior art hydraulic flow system.

FIG. 1 represents a typical prior art hydraulic flow system for the swing motor having an "open center" position in the swing control valve to accomplish centering. As shown therein, a pump 2 pumps hydraulic fluid from the hydraulic tank 3 through line 4 to the swing control valve generally indicated by reference numeral 5. The swing control valve 5 has three positions 6, 7 and 8 and is typically spring centered by means of spring 9 and operated by a manual lever 10. Nevertheless, the swing control valve can be operated by any conventional means, such as by air pressure or hydraulic fluid as is well known in the art.

In the uppermost position 6, as shown in FIG. 1, the swing control valve 5 permits the pump 2 to pump hydraulic fluid from the hydraulic tank 3 to the swing motor 11, through the line 4. The hydraulic swing motor 11 is coupled through a gear reducer to the boom 5 and rotates the boom in the clockwise direction. The return line 12 of the swing motor 11 returns hydraulic fluid to the swing control valve 5, then to the hydraulic tank 3.

When it is desirable to rotate the boom in a counterclockwise fashion, the swing control valve 5 is moved to its lowermost position 8 so that the pump 2 pumps hydraulic fluid through the line 12 to the swing motor. Now line 4 becomes the return line and permits hydraulic fluid to flow from the swing motor 11 through the swing control valve 5 to the hydraulic tank 3.

During the operation of a typical prior art boom crane, it is necessary to hoist loads from one position to another. This is accomplished by the free swing movement illustrated in FIG. 1. The free swing movement consisted of neutral position 7 on the swing control valve 5, which was generally between the clockwise upper position 6 and the counterclockwise lower position 8. The free swing movement was accomplished by merely fluidly connecting the high pressure line with the return flow low pressure line, as represented by reference numeral 13. In this manner, the hydraulic pressure in both lines was quickly equalized so that the hydraulic pressure in the swing motor was quickly equalized. In this position, the swing motor was essentially in a "neutral gear", thus allowing the boom to rotate with no restriction either clockwise or counterclockwise. Accordingly, the "neutral gear", of the swing motor necessitated that the boom be brought to a stop by the swing brake. During operation of the prior free swing circuit the operator would frequently overshoot or undershoot the center position of the load, as previously mentioned. The hoist lines would be connected to the load and as the hoist lines were tightened, the boom would center itself. However, the prior art free swing movement illustrated in FIG. 1 was incapable of restricting the swing speed during the centering operation and did not allow operator control. Moreover, the boom crane could not compensate for wind conditions, a tilted platform or tilted loads during the centering operation.

Figure 2:
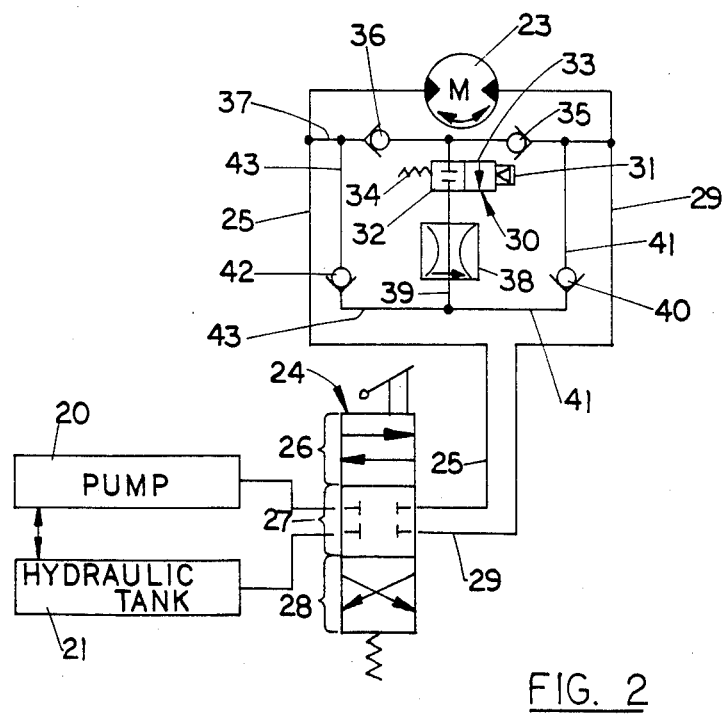
FIG. 2 is a schematic view of the free swing system of the present invention.

In FIG. 2 the free swing system of the present invention is illustrated as it appears within the swing motor hydraulic circuit of an open loop type system. A hydraulic pump 20 pumps hydraulic fluid from the hydraulic tank 21 to the hydraulic swing motor 23 through the swing control valve, generally indicated by reference numeral 24, by means of either lines 25 or 29.

When it is desirable to rotate the boom in clockwise fashion, the three-position swing control valve 24 is positioned in the upper position 26. In this position, hydraulic fluid from pump 20 is pumped to the swing motor 23 through line 25. The return line 29 from the swing motor permits hydraulic fluid to flow through the swing control valve 24 as it is in its top position 26 (see FIG. 2), so that the hydraulic fluid is returned to hydraulic tank 21.

When it is desirable to rotate the boom in the counterclockwise direction, the swing control valve 24 is positioned so that its lowermost position 28 is in alignment with the lines 25 and 29. In this way the hydraulic pump 20 pumps hydraulic fluid through line 29 to hydraulic motor 23, and from the hydraulic motor 23 through the return line 25 to the hydraulic tank 21. The intermediate position 27 of the swing control valve is only employed when no swing or rotational movement of the boom is desired, typically during the latter stages of hoisting.

When it is desired to center the boom during the initial stages of the hoisting operation, the boom is roughly centered over the load by the swing control valve 24. Thereafter, the swing control valve 24 is positioned in its neutral position 27 and hoist lines are attached to the load. Next, the hoist lines are tightened and the free swing system is engaged to permit the boom to rotate in a controlled manner until the boom is centered over the load. During the free swing operation, hydraulic fluid flows from the high pressure line 25 of the swing motor 23 to the low pressure line 29 by flowing through the swing control system which regulates the rate at which hydraulic fluid flows. Thus, the speed of the swing motor 23 is controlled by the amount of hydraulic fluid permitted to flow through the free swing system. During this stage the operator can bias or override the free swing circuit by using the swing control valve 24 to direct hydraulic fluid to the swing motor 23, causing it to rotate in either the clockwise or counterclockwise direction. After the boom is centered over the load, the free swing system is disengaged and simultaneously the swing control valve 24 is shifted to its intermediate neutral position 27 (if it is not already in this position). The boom will now remain in a stationary position so that the load may be hoisted to the required elevation without further swinging of the boom.

More specifically, the free swing system is engaged by activating the on-off valve generally indicated by reference numeral 30. The on-off valve 30 may be any type of valve which is capable of completely prohibiting the flow of fluid and also permitting the unrestrained flow of fluid. Of course, valves capable of quickly shifting from the open position to the closed position and vice versa are preferred, for example, gate valves, cartridge spool valve, spool valve, globe valves, diaphragm valves, ball valves, butterfly valves, or the like. These valves can be actuated by any conventional means such as, manually, an electric solenoid, hydraulic fluid pressure or air pressure, with an air pressure piston being illustrated by reference numeral 31. The air pressure piston shifts the on-off valve 30 from the closed position to the open position, permitting fluid to flow through either check valve 35 or 36 in line 37, to the flow control valve 38 by means of line 39. The check valves 35 and 36 assure that the hydraulic fluid will flow from the high pressure line to the low pressure line through the flow control valve 38. The flow control valve 38 may be any type of valve capable of being regulated or adjusted. Preferably, the flow control valve will not be affected by pressure or temperature variances in order to attain a constant flow of hydraulic fluid. For example, the flow control valve could be a needle valve, globe valve, cartridge spool valve, poppet valve, or the like. The hydraulic fluid flows from the flow control valve 38 through either check valve 40 in line 41, or check valve 42 in line 43. Both lines 41 and 43 are directly coupled to line 37.

In operation of the FIG. 2 device, where it is necessary to rotate the boom in a clockwise manner until it is roughly centered over the load, the swing control valve 24 is positioned in its uppermost position 26. In this manner hydraulic fluid flows from the pump 20 through the swing control valve 24 and into the high pressure line 25 to the hydraulic swing motor 23. Correspondingly, the hydraulic fluid flows through the low pressure return line 29 from the hydraulic motor 23 to the hydraulic tank 21. Once the boom is roughly centered, the swing control valve 24 is positioned in its neutral position 27 and the hoist lines are attached to the load. As the lines are tightened, the free swing system is engaged to permit the boom to rotate in a controlled manner. When the free swing system is activated, the swing motor 23 acts as a pump to cause the fluid to flow through the free swing system. To operate the free swing system, the on-off valve 30 is engaged and a portion of the high pressure fluid in line 25 flows through the check valve 36 to the flow control valve 38. Note that hydraulic fluid is incapable of flowing through the check valves 35 and 42. Thus, the high pressure hydraulic fluid flows from the high pressure line 25 through the on-off valve 30 to the flow control valve 38, which can be variably controlled, thus permitting hydraulic fluid to flow to the low pressure line 29. This is accomplished when the hydraulic fluid flows from the flow control valve 38 through check valve 40. Note that the hydraulic fluid will not flow through check valve 42 because the hydraulic fluid will exert a higher pressure upon one side of the check valve causing it to remain closed. Also, note that the hydraulic fluid will not flow through check valve 35 because one side of the check valve is under high pressure from the hydraulic fluid, while the other side is connected to the low pressure line. Thus, hydraulic fluid flowing through the check valve 40 will flow into the return line 29. Consequently, when the free swing system is engaged, it "bleeds-off" a controlled portion of the hydraulic fluid from the high pressure line 25 to the low pressure return line 29, so that a smaller amount of hydraulic fluid reaches the hydraulic swing motor 23. In this manner, the hydraulic swing motor 23 is rotated clockwise at a greatly reduced speed when compared to its normal operation. A to the low pressure return line 29, so that a smaller amount of hydraulic fluid reaches the hydraulic swing motor 23. In this manner, the hydraulic swing motor 23 is rotated clockwise at a greatly reduced speed when compared to its normal operation. Accordingly, the boom crane operator may reduce the swing speed of the boom crane by engaging the free swing circuit, thus giving the operator finer control of the crane's swinging motion.

When the boom is centered directly over the load to be lifted, the crane operator merely disengages on-off valve 30 which disengages the free swing system. Simultaneously, the crane operator shifts the swing control valve 24 to the neutral intermediate position 27, (if it is not already so positioned) thus causing the boom crane to remain in its centered position. This procedure causes the swing motor to become hydraulically locked and prevents the swing motor from rotating (although hydraulic losses may cause very negligible rotation) when boom swing is undesirable, for example, when a wind load would cause undesirable boom movement during hoisting.

If it is desirable to rotate the boom in a counterclockwise fashion, the swing control valve 24 is merely shifted upwardly so that its lowermost position 28 is in alignment with the lines 25 and 29. In this manner, line 29 is now the high pressure line and the return line 25 is now the low pressure line. To center the boom, the hoist lines are attached to the load after the boom is roughly centered, and the swing control valve 24 is positioned in the neutral position 27 so that the swing motor 23 no longer receives hydraulic fluid flowing from the swing control valve. When the operator engages valve 30 to activate the free swing system, high pressure hydraulic fluid flows through check valve 35. It should be noted that the hydraulic fluid will not flow through check valves 36 and 40 because they are positioned against the flow. The hydraulic fluid flows through the on-off valve 30 to the flow control valve 38, and from the flow control valve 38 to the low pressure line 25, through line 43 and through check valve 42. In this manner, the free swing system "bleeds-off" a portion of the high pressure hydraulic fluid in line 29, permitting it to flow through the return line 25. In turn, the hydraulic swing motor 23, which acts as a pump, rotates at a greatly reduced speed because a greatly reduced volume of hydraulic fluid now flows through the motor. Thus, the motor slowly rotates counterclockwise until the boom is centered over the load to be hoisted.

When the boom is centered over the load, the operator can hoist the load with or without the free swing system. The free swing system may be disengaged after centering to prevent boom rotation in windy weather, as previously explained, or the free swing system may be disengaged to quickly rotate the boom in the normal manner, while hoisting. On the other hand, the free swing system may remain engaged after hoisting when it is desired to rotate the boom in a very slow, controlled manner. To accomplish this, the swing control valve 24 is positioned from the neutral intermediate position 27 to either the clockwise position 26 or counterclockwise position 28.

Figure 3:
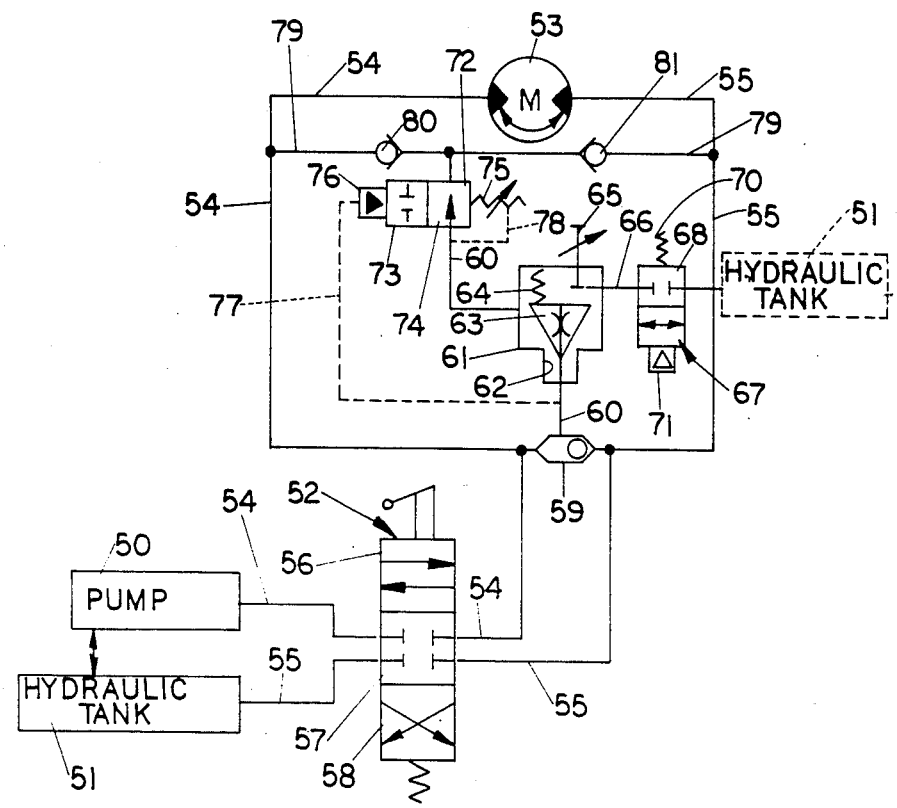
FIG. 3 is a schematic view of a modification of the free swing system of the present invention.

FIG. 3 illustrates a modification of the present invention. As illustrated in FIG. 3, a hydraulic pump 50 pumps hydraulic fluid from the hydraulic tank 51 through the swing control valve, generally indicated by reference numeral 52, to the hydraulic swing motor 53, by means of either line 54 or 55, in much the same fashion as set forth in the device shown in FIG. 2. Thus, depending upon whether the operator wishes to rotate the boom in a clockwise or counterclockwise direction, the swing control valve 52 will be either in its uppermost position 56 or lowermost position 58, respectively.

The free swing system of FIG. 3 includes a double acting check valve 59, which permits hydraulic fluid from the high pressure line (line 54, for example) to flow into line 60, while simultaneously preventing the hydraulic fluid from flowing into the low pressure line (line 55, for example). A poppet valve 61, coupled to line 60, has a small aperture end 62 capable of being completely closed by spool 63. Spool 63 is biased closed by spring 64. An adjustable stop 65 limits the degree to which the poppet valve 61 can be opened by limiting the movement of the spool 63. Line 66 is coupled to the poppet valve 61 at the end opposite the small aperture end 62, and extends to the on-off valve 67, which is coupled to the low pressure line on hydraulic tank 51, shown in phantom for simplifying the illustration. On-off valve 67 is substantially similar to on-off valve 30, shown in FIG. 2, and has a closed position 68, an open position 69, and a spring 70 biasing the valve in the closed position. Like valve 30, valve 67 is actuated by air pressure 71, but may be activated by any means employed for valve 30. Furthermore, valve 67 can be any type of valve previously described for valve 30.

Poppet valve 61 is also coupled to pressure regulating valve 72 by means of line 60. The pressure regulating valve 72 has a closed position 73, an open position 74, and is spring biased open by means of spring 75. The pressure regulating valve 72 is activated by a piston 76 which shifts the valve to the closed position by hydraulic fluid pressure flowing in line 77, which is responsive to the pressure in line 60 between the check valve 59 and the poppet valve 61. Valve 72 may be activated to its open position by hydraulic fluid pressure in line 78, which is coupled to line 60 between poppet valve 61 and valve 72. Thus spring 75 and pressure in line 78 urge the valve 72 open, while pressure in line 77 urges the valve 72 closed. From pressure regulating valve 72, the hydraulic fluid flows into line 79, through either check valve 80 or 81, and into the low pressure return lines.

When the free swing system of the FIG. 3 modification is engaged, the higher pressure hydraulic fluid flows through check valve 59, into line 60 to the poppet valve 61. The operator engages the on-off valve generally indicated by reference numeral 67. This permits the poppet valve 61 to open, which in turn opens pressure regulating valve 72. Opening the valve 67 permits hydraulic fluid above spool 63 of poppet valve 61 to drain into hydraulic tank 51 through line 66. Unless the on-off valve 67 is open to drain the hydraulic fluid, the fluid pressure behind the spool 63 closes the spool. This is so because the surface area at the upper end of the spool 63 is larger than the surface area of the opposite end thereof and greater force is exerted on the upper end of the spool by the hydraulic fluid. In addition to the hydraulic force, the spring force from spring 64 exerts further force upon the upper end of the spool 63. Once the fluid from behind the spool 63 flows to the reservoir, the spool 63 opens until it contacts stop 65.

Once the valve 67 is open, it must remain open to enable the small amount of continuously accumulating hydraulic fluid to drain to the hydraulic tank 51. As soon as the valve 67 is closed, the fluid quickly accumulates behind the upper end of spool 63 and the valve 67 quickly closes.

Once the poppet valve 61 is opened, the pressure regulating valve 72 opens because of the combination of the force of the spring 75 and of the hydraulic pressure in line 78. The purpose of the pressure regulating valve 72 is to maintain a constant pressure drop across the poppet valve 61 regardless of the hydraulic fluid pressure or temperature. For example, if there is a sudden pressure surge, the increase in pressure in line 60 tends to cause the pressure regulating valve 72 to close because of the increased pressure in line 77, thus tending to equalize the pressure drop across poppet valve 61. If there is a sudden pressure drop in line 60, the opposite response occurs. Accordingly, it can be seen that the pressure regulating valve 72 has a fully opened position and a fully closed position, and it can also be positioned at an infinite number of positions therebetween, in order to maintain a constant pressure drop.

Hydraulic fluid flows from pressure regulating valve 72 to line 79, and through check valve 81 to low pressure return line 55. Note that the fluid will not flow through check valve 80 because it is incapable of overcoming the high pressure within line 54. In this manner, the free swing system controls the flow of the hydraulic fluid being pumped by the hydraulic swing motor 53, as it is caused to rotate due to the force caused by any sidelead angle in the hoist line as the load is lifted. Accordingly, the rotational speed of the swing motor and boom is greatly reduced.

When the boom is centered over the load, the operator disengages valve 67, thus permitting it to close. Simultaneously, the operator shifts the swing control valve 52 to the neutral position 57, if it is not already in this position, as described with respect to the FIG. 2 device.

Modifications of the present invention may be accomplished without departing from the spirit of it. For example, the operation of the present invention has been discussed with respect to an open loop hydraulic system only, however the device will work in the same fashion in a closed loop hydraulic system.

What is claimed is:

1. A method of controlling rotational movement of a boom on a crane provided with a hydraulic system either of the closed loop type or the open loop type wherein a hydraulic swing motor and swing control means impart rotational movement in either of two directions to said boom, said method comprising regulating the rate of flow of hydraulic fluid from a high pressure line through said hydraulic motor to a low pressure line by transferring a portion of the hydraulic fluid from said high pressure line to said low pressure line through an adjustable fluid coupling between said high pressure line and said low pressure line, and operating said hydraulic swing motor as a pump in transferring said portion of hydraulic fluid through said fluid coupling, whereby to reduce the rotational speed of said hydraulic motor and consequent swing speed of said boom.

2. The method of claim 1, including the step of maintaining a constant pressure drop across said fluid coupling.

3. A method of centering a boom of a crane over a load to be hoisted, said boom having a hydraulic system either of the closed loop type or the open loop type wherein a hydraulic swing motor and swing control means impart rotational movement in either of two directions to said booms, said method comprising the steps of rotating said boom until it is roughly centered over said load, placing said swing control means in a neutral position, engaging manually means for transferring a portion of the hydraulic fluid from a high pressure line to a low pressure line so as to regulate the rate of flow of hydraulic fluid through said hydraulic motor and to reduce the speed of rotation thereof, attaching hoist lines to said load, tightening the hoist lines thus imparting a force caused by any sidelead angle to said boom until said boom is precisely over said load, and disengaging manually said means for transferring a portion of the hydraulic fluid.

4. A method of centering a boom of a crane over a load to be hoisted and thereafter hoisting said load with said boom, said boom having a hydraulic system either of the closed loop type or the open loop type wherein a hydraulic swing motor and swing control means impart rotational movement in either of two directions to said boom, said method comprising the steps of rotating said boom until it is roughly centered over said load, placing said swing control means in a neutral position, engaging manually means for transferring a portion of the hydraulic fluid from a high pressure line to a low pressure line so as to regulate the rate of flow of hydraulic fluid through said hydraulic motor and to reduce the speed of rotation thereof, attaching hoist lines to said load, tightening the hoist lines thus imparting a force caused by any sidelead angle to said boom until said boom is precisely over said load, disengaging manually said means for transferring a portion of the hydraulic fluid, and hoisting said load with said boom in a stationary position.

5. The method of claim 4, including the step of rotating said hydraulic swing motor in either of two directions at a reduced speed after the step of tightening the hoist lines by overriding said means for transferring a portion of the hydraulic fluid.

* * * * *

UNITED STATES PATENT AND TRADEMARK OFFICE
CERTIFICATE OF CORRECTION

PATENT NO. : 4,782,662

DATED : November 8, 1988

INVENTOR(S) : William E. Reeves and Jasper E. Cobb III

It is certified that error appears in the above-identified patent and that said Letters Patent is hereby corrected as shown below:

On the title page, after item [73], insert the following item

[*] The portion of the term of this patent subsequent to Mar. 31, 2004, has been disclaimed.

Signed and Sealed this

Fourteenth Day of January, 1992

Attest:

HARRY F. MANBECK, JR.

*Attesting Officer*     *Commissioner of Patents and Trademarks*